US007960872B1

(12) United States Patent
Zhai et al.

(10) Patent No.: US 7,960,872 B1
(45) Date of Patent: Jun. 14, 2011

(54) SIDE ILLUMINATION LIGHT EMITTING DIODE LIGHTING DEVICE

(75) Inventors: Jinhui Zhai, Oldsmar, FL (US); Israel J. Morejon, Tampa, FL (US)

(73) Assignee: LEDnovation, Inc., Tampa, FL (US)

( * ) Notice: Subject to any disclaimer, the term of this patent is extended or adjusted under 35 U.S.C. 154(b) by 406 days.

(21) Appl. No.: 12/355,030

(22) Filed: Jan. 16, 2009

(51) Int. Cl.
*H02J 9/02* (2006.01)

(52) U.S. Cl. ........... 307/157; 307/151; 362/84; 362/231

(58) Field of Classification Search .................... 307/72, 307/149, 151, 157; 362/84, 231, 241, 245, 362/247, 249.02, 800; 315/250, 272
See application file for complete search history.

(56) References Cited

U.S. PATENT DOCUMENTS 7,703,949 B2 * 4/2010 Lai ................................ 362/294

* cited by examiner

*Primary Examiner* — Jared J Fureman
*Assistant Examiner* — Carlos Amaya
(74) *Attorney, Agent, or Firm* — Molly L. Sauter; Smith & Hopen, P.A.

(57) ABSTRACT

The present invention discloses a side illumination LED lighting device which includes at least one semiconductor light emitter mounted on a thermally conductive substrate and positioned within a reflective cavity such that the forward light path of the LED is directed towards a reflective member. The reflective member is effective in re-directing the light from the semiconductor light emitter such that the light is extracted from the side of the lighting device through a substantially transparent output window, thereby provide a side illumination solid-state semiconductor lighting device. The lighting device may further include a wavelength conversion element to facilitate the production of a white light that can be extracted from the side of the lighting device.

22 Claims, 4 Drawing Sheets

SIDE ILLUMINATION LIGHT EMITTING DIODE LIGHTING DEVICE

FIELD OF THE INVENTION

The invention relates generally to solid state lighting devices, as well as related components, systems and methods and more particularly to a side illumination light emitting diode (LED) lighting device.

BACKGROUND OF THE INVENTION

It is well known that incandescent light bulbs are very energy inefficient light sources, wherein approximately 90% of the electricity they consume is released as heat rather than light. Fluorescent light bulbs are about ten times more efficient than incandescent light bulbs, but they are still less efficient than solid state semiconductor emitters, such as light emitting diodes. Solid state semiconductor emitters are approximately twice as efficient as fluorescent light bulbs.

In addition, incandescent light bulbs experience a relatively short lifetime (e.g., 750-1000 hours). While, fluorescent light bulbs experience a longer lifetime than incandescent lights (e.g., 10,000-20,000 hours), they also contain mercury, making them a non-environmentally friendly light source. Additionally, fluorescent light bulbs provide less favorable color reproduction than incandescent light bulbs. In comparison, solid state light emitters, such as LEDs, experience a much longer lifetime than both incandescent light bulbs and fluorescent light bulbs (e.g., 50,000-75,000 hours). Additionally, solid state light emitters are a clean, "green", light source and are capable of achieving superior color reproduction in comparison to incandescent and fluorescent light bulbs.

Accordingly, for these and other reasons, efforts have been ongoing to develop solid state lighting devices to replace incandescent light bulbs, fluorescent lights and other light-generating devices in a wide variety of applications. In addition, where solid state light emitters are already being used, efforts are ongoing to provide improvement with respect to energy efficiency, color rendering index (CRI Ra), luminous efficacy (lm/W), color temperature, and/or duration of service, particularly for indoor applications.

Semiconductor light emitting devices (LEDs) known in the art, extract the light in a light emitting forward direction from the top of the lighting device. Extracting the light in a forward direction limits the application of the LED as a light source for both residential and commercial lighting applications because the LED cannot be used as a light source in lighting devices which require the light to be extracted from the side of the lamp to light the entire room space instead of only the floor or ceiling area. Chandeliers, floor lamps, desk lamps, table lamps, ceiling lights and other home and commercial decorative lights require that the light be extracted from the side of the lamp to achieve the desired illumination. Currently, LED lighting devices known in the art are incapable of extracting the light emitted from the LED from the side of the lamp and are limited to extracting light in a light emitting forward direction.

There remains a need, therefore, for an improved solid state lighting device that allows for light extraction from the sides of a lamp that will allow for the use of solid state lighting devices in applications where light needs be extracted from the side of the lamp to achieve the desired illumination.

However, in view of the prior art taken as a whole at the time the present invention was made, it was not obvious to those of ordinary skill how the identified need could be fulfilled.

SUMMARY OF THE INVENTION

The long-standing but heretofore unfulfilled need for an apparatus and method for an improved solid state lighting device that allows for light extraction from the sides of a lamp that will allow for the use of solid state lighting devices in applications where light needs be extracted from the side of the lamp to achieve the desired illumination is now met by a new, useful, and non-obvious invention.

The present application discloses a system and method for a side illumination LED lighting device for residential and commercial lighting applications where the emission of light from the side of the lighting device is desirable.

In a first embodiment of the present invention, a side illumination solid-state lighting device is provided including a reflective cavity enclosed by an electrical power connector, a substantially transparent output window and a thermally conductive substrate. To form the light reflective cavity, the output window has a first end mounted about a peripheral edge of a top surface of the electrical power connector and a second end mounted about a peripheral edge of a bottom surface of the thermally conductive substrate. The electrical power connector and the thermally conductive substrate are disposed in a substantially parallel relation to one another. A support post is positioned along a center axis of the light reflective cavity. In this embodiment, at least one semiconductor light emitting element is mounted on a bottom surface of the thermally conductive substrate and positioned within the reflective cavity such that a forward light emitting path of the at least one semiconductor light emitting element is directed towards the electrical power connector. A reflective member is positioned within the reflective cavity such that at least a portion of the light emitted from the semiconductor light emitting element will be reflected by the reflective member and extracted through the output window. The reflective member may be positioned to cover the top surface of the electrical power connector and may additionally be positioned the support post between the electrical power connector and the thermally conductive substrate. An electrical conversion member is above the thermally conductive substrate, external to the light reflective cavity. The electrical conversion member is adapted to receive AC power and to convert the AC power to DC current to drive the semiconductor light emitting element. A thermal heat sink member is positioned to enclose the top surface of the thermally conductive substrate and the electrical conversion member. The thermal heat sink member may be fabricated of any thermally conductive material and in a particular embodiment is fabricated of aluminum. A power line is positioned within the support post to electrically connect the thermally conductive substrate to the electrical power connector and to provide AC power from the electrical power connector to the electrical conversion member mounted on the thermally conductive substrate.

The lighting device may further include a reflective member positioned on the thermally conductive substrate to surround the at least one semiconductor light emitting element, this reflective member is effective in recycling the back-transferred light from the reflective member.

The lighting device may include a single light emitting element or a plurality of light emitting elements. All of the light emitting elements may emit the same color light or each of the light emitting elements may emit a different color light, such that a specific color light or white light is provided through the output window.

The semiconductor light emitting elements may be circumferentially spaced apart from one another on a plurality of concentric circles on the thermally conductive substrate.

The reflective member of the lighting device may be a diffusive reflector.

The substantially transparent output window of the lighting device may have a haze effect to diffuse the light extracted from the output window.

While various shapes of the lighting device are within the scope of the present invention, in a particular embodiment, the combined shape of the thermal heat sink member and the output window forms a standard A19 light bulb shape.

The electrical power connector of the lighting device may be a standard Edison-type screw connector such that the lighting device can be used to replace a standard incandescent light bulb.

In a second embodiment of the present invention, a side illumination solid-state lighting device is provided that includes a reflective cavity enclosed by an electrical power connector, a substantially transparent output window and a thermally conductive substrate. To form the reflective cavity, the output window has a first end mounted about a peripheral edge of a top surface of the electrical power connector and a second end mounted about a peripheral edge of a bottom surface of the thermally conductive substrate. The electrical power connector and the thermally conductive substrate are disposed in a substantially parallel relation to one another. A support post is positioned along a center axis of the light reflective cavity. An electrical conversion member is above the top surface of the thermally conductive substrate, exterior to the light reflective cavity. A thermal heat sink member is positioned to enclose the top surface of the thermally conductive substrate and the electrical conversion member. At least one semiconductor light emitting element is mounted on the bottom surface of the thermally conductive substrate and positioned within the reflective cavity such that a forward light emitting path of the semiconductor light emitting element is directed towards the electrical power connector. A first wavelength conversion element is positioned within the reflective cavity, the first wavelength conversion element to absorb a primary light emitted from light emitting element and to convert at least a portion of the primary light to a secondary light having a second wavelength. A reflective member is positioned within the reflective cavity such that at least a portion of the primary light and at least a portion of the secondary light will be reflected by the reflective member and extracted through the output window. A power line is positioned within the support to electrically connect the thermally conductive substrate to the electrical power connector.

In the second embodiment, the first wavelength conversion element may be deposited on the semiconductor light emitting element or, alternatively, it may be deposited on the reflective member.

The semiconductor light emitting element may emit a blue primary light and the first wavelength conversion element may be a yellow phosphor or a green/orange phosphor mixture.

In addition, a second wavelength conversion element may additionally be deposited on the reflective member. If the second wavelength conversion element is a reddish orange phosphor, then the combination of the primary blue light, the yellow light excited by the first wavelength conversion element and the reddish orange light excited by the second wavelength conversion element will result in a warm white light. Additionally, a semiconductor light emitting element to emit a green light may be added to compensate for the shortage of bluish green spectrum in the excited yellow light.

The semiconductor light emitting element may emit a near-UV primary light and the first wavelength conversion element may be a blue, red and green quantum dots mixture.

Alternatively, the semiconductor light emitting element may emit a near-infrared primary light and the first wavelength conversion element may be an up-conversion phosphor.

In a third embodiment of the present invention, a side illumination solid-state lighting device includes a reflective cavity enclosed by an electrical power connector, a substantially transparent output window and a first reflective element. To form the reflective cavity in this embodiment, the output window has a first end mounted about a peripheral edge of a top surface of the electrical power connector and a second end mounted about a peripheral edge of a bottom surface of the first reflective element. The electrical power connector and the first reflective element are disposed in a substantially parallel relation to one another. A support post is positioned along a center axis of the light reflective cavity. An electrical conversion member is positioned above a top surface of the first reflective element and a thermal heat sink member is positioned to enclose the top surface of the first reflective element and the electrical conversion member. A thermally conductive substrate is positioned on an interior wall of the reflective cavity, below the first reflective member and at least one semiconductor light emitting element is mounted on the thermally conductive substrate and positioned within the reflective cavity such that a forward light emitting path of the at least one semiconductor light emitting element is directed towards a center axis of the reflective cavity. A first wavelength conversion element is positioned within the reflective cavity, the first wavelength conversion element to absorb a primary light emitted from the semiconductor light emitting element and to convert at least a portion of the primary light to a secondary light having a second wavelength. A second reflective member is positioned within the reflective cavity such that at least a portion of the light emitted from the semiconductor light emitting element will be reflected by the first reflective member and the second reflective member, and extracted through the output window. A power line is positioned within the support post to electrically connect the electrical conversion member to the electrical power connector.

In this embodiment, the at least one semiconductor light emitting element may emit a blue primary light and the first wavelength conversion element may be a yellow phosphor or a green/orange phosphor mixture. Additionally, the lighting device may include a second wavelength conversion element deposited on the reflective member. If the second wavelength conversion element is a reddish orange phosphor, then the combination of the primary blue light, the yellow light excited by the first wavelength conversion element and the reddish orange light excited by the second wavelength conversion element will result in a warm white light.

An object of the present invention is to provide a side illumination LED lighting device for lighting applications where the emission of light from the side of the lighting device is desirable.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
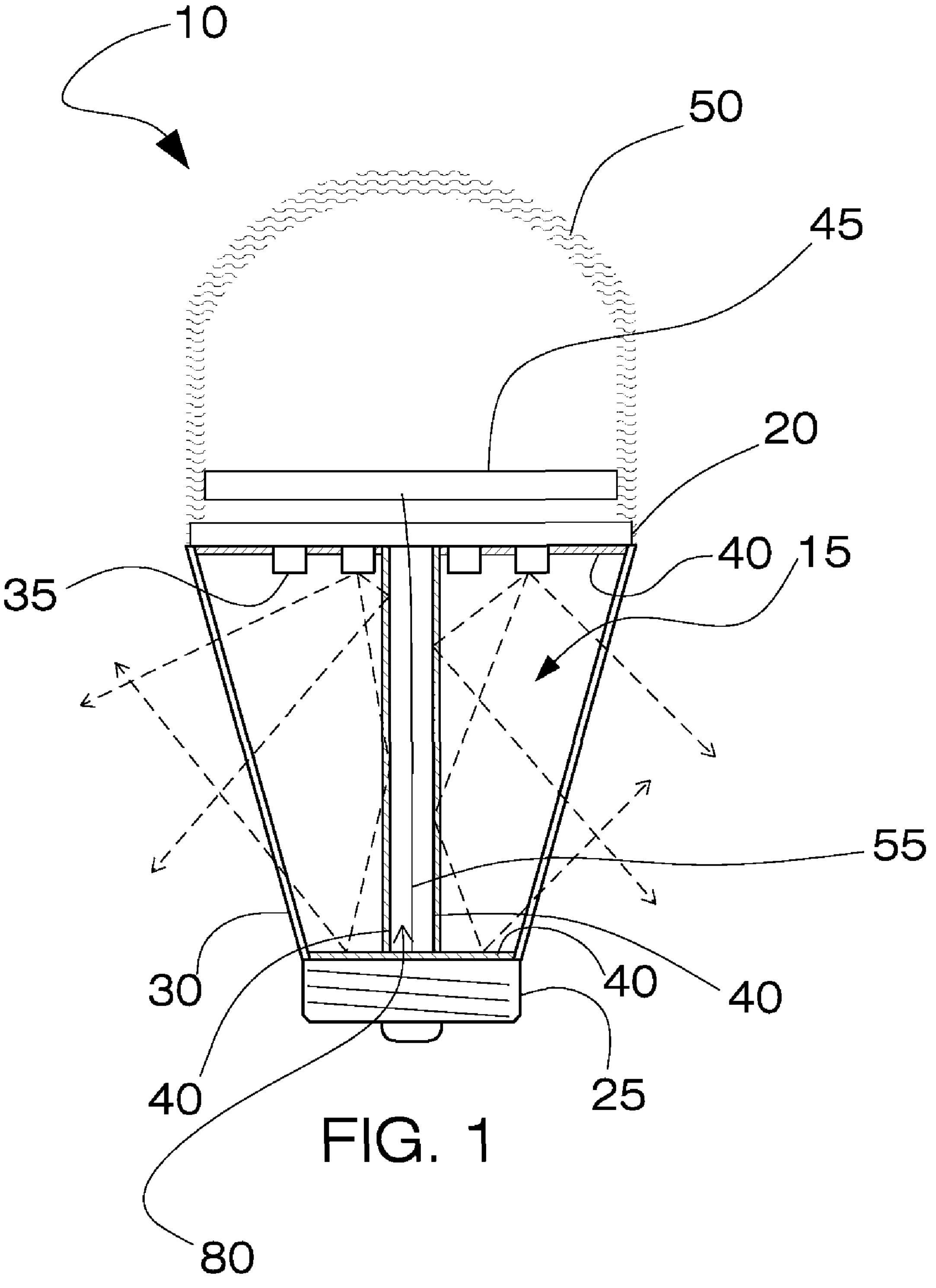
FIG. 1 is a diagrammatic view of the first embodiment in accordance with the present invention.

Referring now to FIG. 1, it will be seen that an illustrative embodiment of the invention is denoted as a whole by the reference numeral 10.

In the embodiment of FIG. 1, a side illumination solid-state lighting device 10 is illustrated including, a light reflective cavity 15 enclosed by an electrical power connector 25, a substantially transparent output window 30 and a thermally conductive substrate 20. To form the reflective cavity, the output window 30 has a first end mounted about a peripheral edge of a top surface of the electrical power connector 25 and a second end mounted about a peripheral edge of a bottom surface of the thermally conductive substrate 20. The electrical power connector 25 and the thermally conductive substrate 20 are disposed in substantially parallel relation to one another. A support post 80 is positioned along a center axis of the light reflective cavity. In this embodiment, at least one semiconductor light emitting element 35 is mounted on a bottom surface of the thermally conductive substrate 20 and positioned within the reflective cavity 15 such that a forward light emitting path of the at least one semiconductor light emitting element is directed towards the electrical power connector 25. A reflective member 40 is positioned within the reflective cavity 15 such that at least a portion of the light emitted from the at least one semiconductor light emitting element 35 will be reflected by the reflective member 40 and extracted through the output window 30. The reflective member 40 may be positioned to cover the top surface of the electrical power connector 25 and to cover the support post 80 between the electrical power connector 25 and the thermally conductive substrate 20. An electrical conversion member 45 is mounted on a above the thermally conductive substrate 20, external to the light reflective cavity. The electrical conversion member 45 converts AC power to DC current to drive the semiconductor light emitting element 35. A thermal heat sink member 50 is positioned to enclose the top surface of the thermally conductive substrate 20 and the electrical conversion member 45. The thermal heat sink member 50 may be fabricated of any thermally conductive material and in a particular embodiment is fabricated of aluminum. The thermal heat sink member 50 is in thermal contact with the thermally conductive substrate 20 to assist in the dissipation of heat generated by the semiconductor light emitting elements 35. A power line 55 is positioned within the support post 80 to electrically connect the thermally conductive substrate 20 to the electrical power connector 25.

In accordance with the present invention, when a source of AC electrical power is supplied to the electrical power connector 25 of the side illumination solid-state lighting device 10, the power is transferred to the electrical conversion member 50 through the power line 55. The electrical conversion member 45 then converts the AC power to a DC current. The DC current is then used to drive the semiconductor light emitting elements 35, causing them to emit light in a forward direction. In this embodiment, the forward direction is toward the top surface of the electrical power connector 25.

The top surface of the electrical power connector 25 is covered with a reflective member 40, and the reflective member 40 additionally covers the support post 80 between the thermally conductive substrate 20 and the electrical power connector 25 such that the light emitted from the light emitting elements 35 is reflected off of the reflective member 40 and extracted through the output window 30.

Accordingly, the solid state lighting device 10 of the present invention is designed to provide side-illumination through the output window 30 using semiconductor light emitting elements 35 that are limited to emitting forward directed light.

Each of the semiconductor light emitting elements 35 is designed to emit a particular wavelength of light. The color of the light is dependent upon the wavelength of the light emitted by the semiconductor light emitting element 35. All of the light emitting elements 35 of the solid state lighting device 10 may be designed to emit the same color light to provide a colored light emitting device. In an exemplary embodiment, each of the light emitting elements 35 may emit a single blue, green or red light. Alternatively, a combination of different semiconductor light emitting elements 35 may be used in the solid state lighting device 10 to produce a desired color of light or a white light. Configurable currents are used to supply the red, green and blue light emitters.

Various designs of the electrical power connector 25 are within the scope of the present invention that will allow the lighting device 10 to be connected to a source of electrical power. In a particular embodiment, the electrical power connector 25 is a standard Edison-type power connector such that the lighting device 10 can be used in the place of a standard incandescent light bulb.

Figure 2:
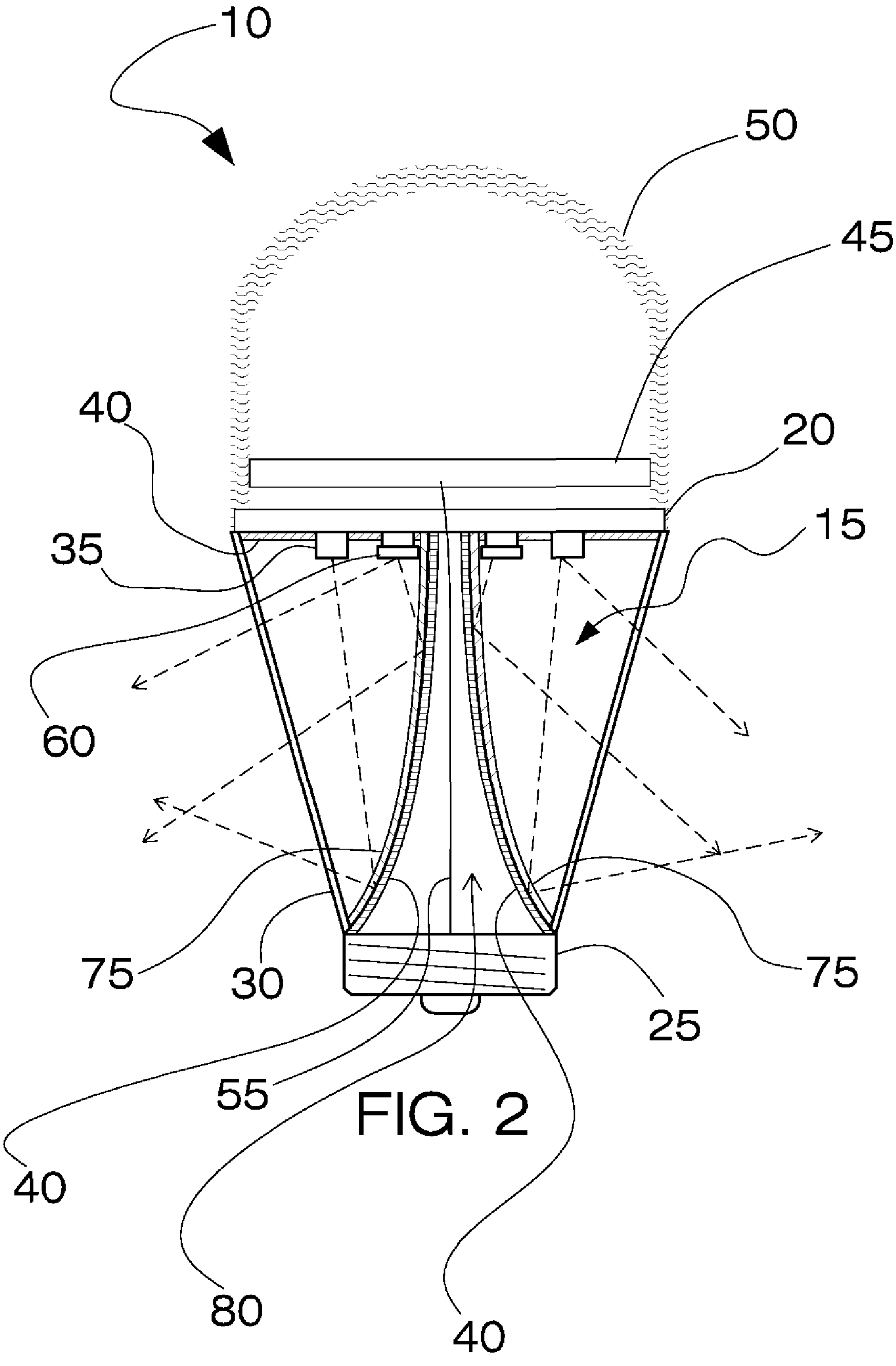
FIG. 2 is a diagrammatic view of a second embodiment in accordance with the present invention.

A second embodiment of the present invention is illustrated with reference to FIG. 2. In this embodiment, a side illumination solid-state lighting device 10 is provided that includes a reflective cavity 15 enclosed by an electrical power connector 25, a substantially transparent output window 30 and a thermally conductive substrate 20. To form the reflective cavity 15, the output window 30 has a first end mounted about a peripheral edge of a top surface of the electrical power connector 25 and a second end mounted about a peripheral edge of a bottom surface of the thermally conductive substrate 20. The electrical power connector 25 and the thermally conductive substrate 20 are disposed in substantially parallel relation to one another. A support post 80 is positioned along a center axis of the light reflective cavity. An electrical conversion member 45 is mounted above the top surface of the thermally conductive substrate 20, external to the light reflective cavity 15. A thermal heat sink member 50 is positioned to enclose the top surface of the thermally conductive substrate 20 and the electrical conversion member 45. At least one semiconductor light emitting element 35 is mounted on the bottom surface of the thermally conductive substrate 20 and positioned within the reflective cavity 15 such that a forward light emitting path of the at least one semiconductor light emitting element 35 is directed towards the electrical power connector 25. A first wavelength conversion element 60 is positioned within the reflective cavity 15, the first wavelength conversion element 60 absorbs a primary light emitted from the at least one semiconductor light emitting element 35 and converts at least a portion of the primary light to a secondary light having a second wavelength. A reflective member 40 is positioned within the reflective cavity 15 such that at least a portion of the primary light and at least a portion of the secondary light will be reflected by the reflective member 40 and extracted through the output window 30. An electrical conversion member 45 is mounted above the thermally conductive substrate 20 and a power line 55 is positioned within the support post 80 to electrically connect the thermally conductive substrate 20 to the electrical power connector 25.

In this embodiment, when electrical power is supplied to the electrical conversion member 45 through the electrical power connector 25 and the power line 55, the combination of the primary light emitted by the semiconductor light emitting element 35 and the secondary light resulting from the excitation of the wavelength conversion element 60 produces a white light, which is then extracted from the side of the lighting device, through the output window 30, to provide side illumination.

In the second embodiment, the first wavelength conversion element 60 may be deposited on the at least one semiconductor light emitting element 35 or it may be deposited on the reflective member 40.

In a specific embodiment, the semiconductor light emitting element 35 may emit a blue primary light with a peak wavelength from 430 nm-470 nm, and the first wavelength conversion element 60 may be a YAG or silicate based yellow phosphor or a green/orange phosphor mixture. In addition, a second wavelength conversion element 75 may additionally be deposited on the reflective member 40. If the second wavelength conversion element 75 is a reddish orange phosphor, then the combination of the primary blue light, the yellow light excited by the first wavelength conversion element 60 and the reddish orange light excited by the second wavelength conversion element 75 will result in a warm white light having a correlated color temperature from 2700K-3500K and a color rendering index above 80.

Additionally, a semiconductor light emitting element 35 that emits a green light may be used in the lighting device 10 to compensate for the shortage of bluish green spectrum in the excited yellow light. In this embodiment, the combination of the primary blue light, the emitted reddish orange light and the excited yellow and green light produce a warm white light with correlated color temperature from 2700K-3500K and a color rendering index above 85.

In an exemplary embodiment, the semiconductor light emitting element 35 may emit a near-UV primary light with a peak wavelength from 380 nm-420 nm and the first wavelength conversion element 60 may be a blue, red and green quantum dots mixture.

In an additional embodiment, the semiconductor light emitting element 35 may emit a near-infrared primary light with a peak wavelength from 850 nm-1300 nm and the first wavelength conversion element 60 may be an up-conversion phosphor.

The shape of the reflective member 40 on the support post 80 may be modified to provide for better reflection of the light through the output window 30. As shown with reference to FIG. 2, the support post 80 is positioned along a center axis of the reflective cavity and is tapered at a first end adjacent to the thermally conductive substrate 20 and flared at a second end adjacent to the electrical power connector 25. As such, in this embodiment, it is not necessary to cover the surface of the electrical power connector 25 with the reflective member 40.

Figure 3:
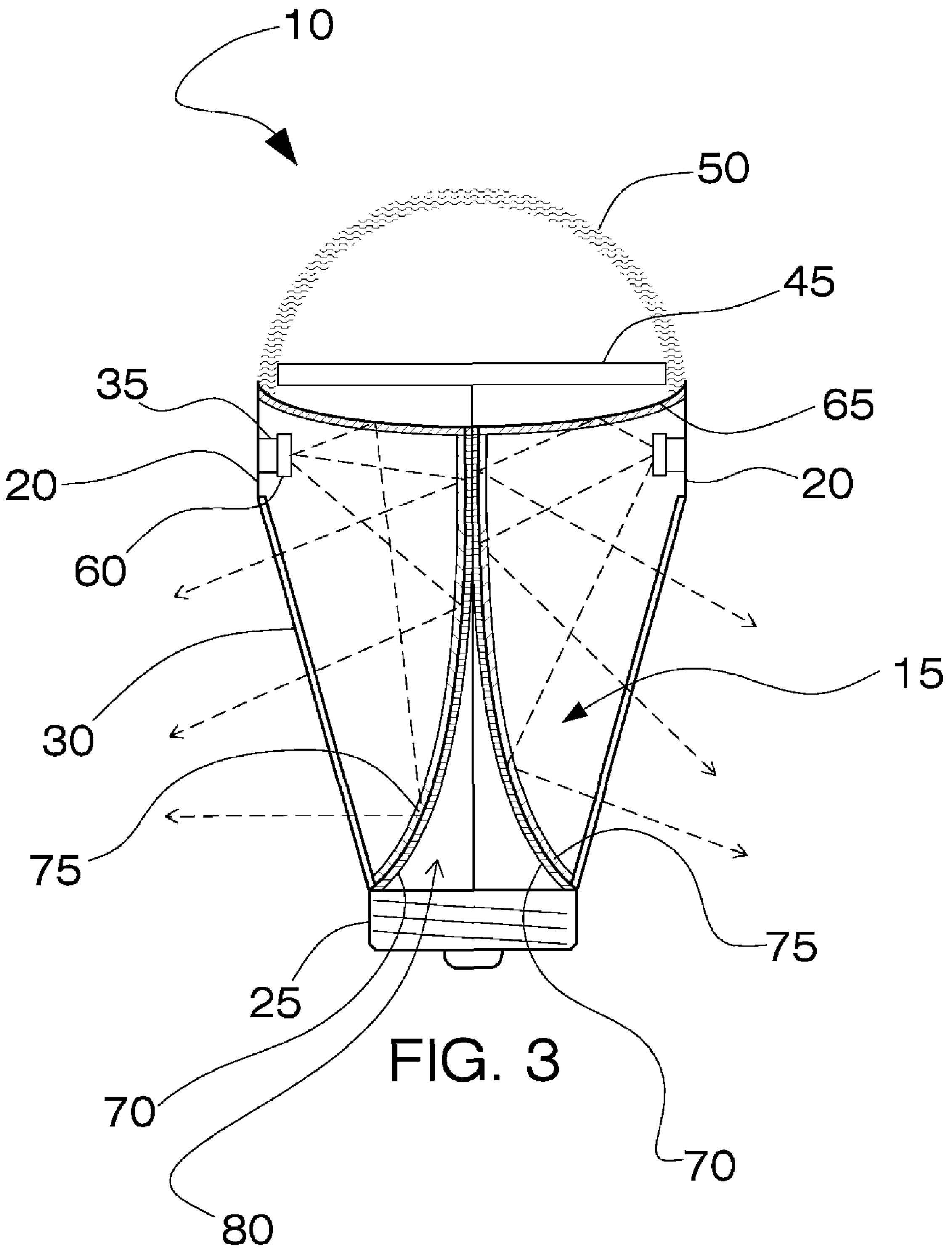
FIG. 3 is a diagrammatic view of a third embodiment in accordance with the present invention.

In a third embodiment of the present invention, illustrated in FIG. 3, a side illumination solid-state lighting device 10 includes a reflective cavity 15 enclosed by an electrical power connector 25, a substantially transparent output window 30 and a first reflective element 65. To form the reflective cavity 15 in this embodiment, the output window 30 has a first end mounted about a peripheral edge of a top surface of the electrical power connector 25 and a second end mounted about a peripheral edge of a bottom surface of the first reflective element 65. The electrical power connector 25 and the first reflective element 65 are disposed in substantially parallel relation to one another. A support post 80 is positioned along a center axis of the light reflective cavity. An electrical conversion member 45 is positioned above a top surface of the first reflective element 65 and a thermal heat sink member 50 is positioned to enclose the top surface of the first reflective element 65 and the electrical conversion member 45. A thermally conductive substrate 20 is positioned on an interior wall of the reflective cavity 15, below the first reflective member 65 and at least one semiconductor light emitting element 35 is mounted on the thermally conductive substrate 20 and positioned within the reflective cavity 15 such that a forward light emitting path of the at least one semiconductor light emitting element 35 is directed towards a center axis of the reflective cavity 15. A first wavelength conversion element 60 is positioned within the reflective cavity 15, the first wavelength conversion element to absorb a primary light emitted from the at least one semiconductor light emitting element 35 and to convert at least of portion of the primary light to a secondary light having a second wavelength. A second reflective member 70 is positioned within the reflective cavity 15 such that at least a portion of the light emitted from the at least one semiconductor light emitting element 35 will be reflected by the first reflective member 65 and the second reflective member 70, and extracted through the output window 30. A power line 55 is positioned within the support post 80 to electrically connect the electrical conversion member 45 to the electrical power connector 25.

As shown with reference to FIG. 3, the first reflective member 65 may be curved in the direction of the electrical power connector 25 to provide for more efficient reflection of the light emitted by the semiconductor light emitting element 35. Additionally, the second support post 80 may be tapered at a first end adjacent to the thermally conductive substrate 20 and flared at a second end adjacent to the electrical power connector 25.

The first reflective member 65 and second reflective member 70 may be diffuse reflectors.

In this embodiment, when electrical power is supplied to the electrical power connector 25, the combination of primary light emitted by the semiconductor light emitting element 35 in combination with the light excited by the first wavelength conversion element 60 produces a white light that is then extracted from the side of the lighting device 10 resulting in side illumination.

In an exemplary embodiment, the at least one semiconductor light emitting element 35 may emit a blue primary light and the first wavelength conversion element 60 may be a yellow phosphor or a green/orange phosphor mixture.

In an additional embodiment, the lighting device may include a second wavelength conversion element 75 deposited on the first reflective member 65 or the second reflective member 70. If the second wavelength conversion element 75 is a reddish orange phosphor, then the combination of the primary blue light, the yellow light excited by the first wavelength conversion element 60 and the reddish orange light excited by the second wavelength conversion element 75 will result in a warm white light with correlated color temperature from 2700K-3500K and a color rendering index above 80.

Figure 4:
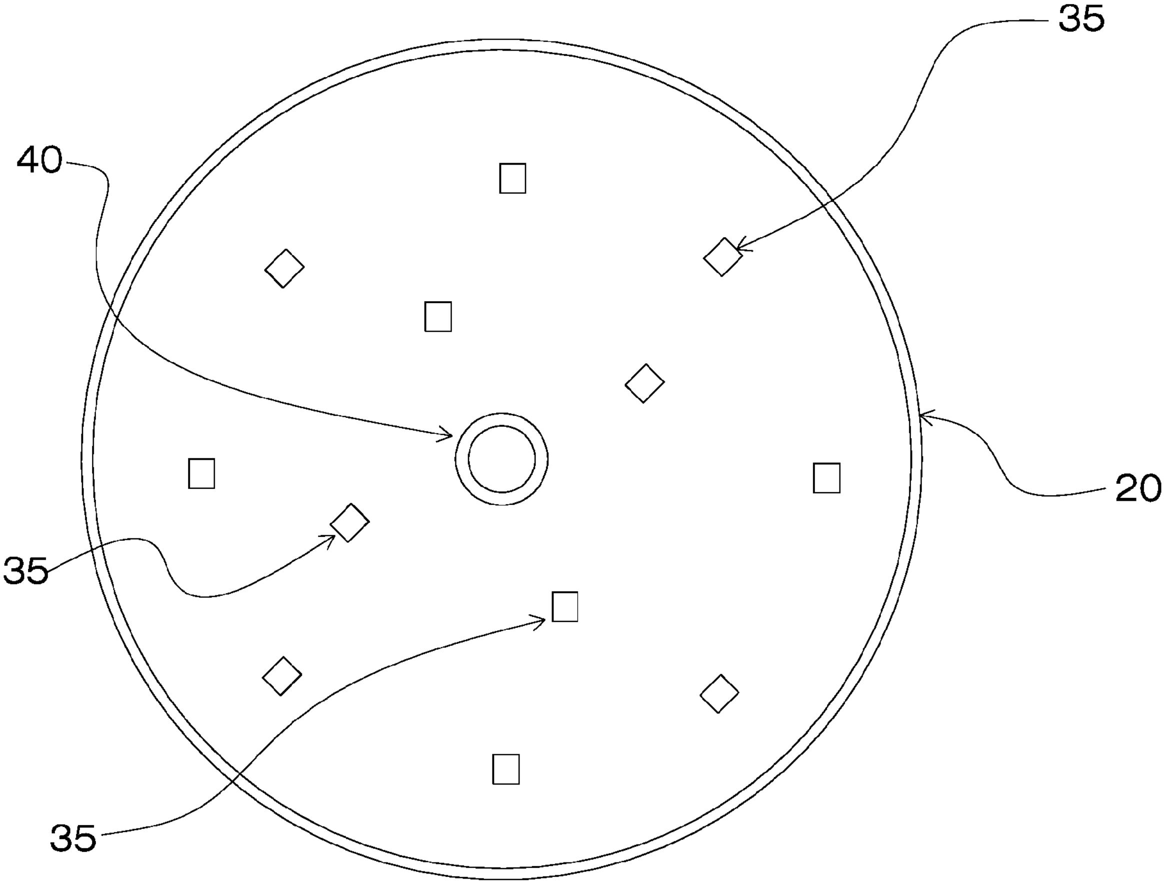
FIG. 4 is a diagrammatic of the bottom side of the thermally conductive substrate, interior to the light reflective cavity.

The semiconductor light emitting elements 35 may be positioned in a variety of ways on the surface of the thermally conductive substrate 20. In a particular embodiment, illustrated in FIG. 4, the light emitting elements 35 are positioned on the thermally conductive substrate 20 such that they are circumferentially spaced apart from one another on a plurality of concentric circles. This configuration provides a well distributed source of light for the lighting device.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A side illumination solid-state lighting device, comprising:

a light reflective cavity enclosed by an electrical power connector, a substantially transparent output window and a thermally conductive substrate, the output window having a first end mounted about a peripheral edge of a top surface of the electrical power connector and a second end mounted about a peripheral edge of a bottom surface of the thermally conductive substrate, wherein the electrical power connector and the thermally conductive substrate are disposed in substantially parallel relation to one another;

a support post positioned along a center axis of the light reflective cavity;

at least one semiconductor light emitting element mounted on a bottom surface of the thermally conductive substrate and positioned within the reflective cavity such that a forward light emitting path of the at least one semiconductor light emitting element is directed towards the electrical power connector;

a reflective member positioned within the reflective cavity such that at least a portion of the light emitted from the at least one semiconductor light emitting element will be reflected by the reflective member and extracted through the output window;

an electrical conversion member positioned above the thermally conductive substrate and external to the light reflective cavity;

a thermal heat sink member positioned to enclose the electrical conversion member and in contact with a peripheral edge of the thermally conductive substrate; and a power line positioned within the support post to electrically connect the electrical conversion member to the electrical power connector.

2. The lighting device of claim 1, wherein the reflective member substantially covers the surface of the electrical power connector positioned within the light reflective cavity, the surface of the thermally conductive substrate between the semiconductor light emitting elements and the surface of the support post.

3. The lighting device of claim 1, wherein the support post is tapered at a first end adjacent to the thermally conductive substrate and flared at a second end adjacent to the electrical power connector.

4. The lighting device of claim 1, further comprising a plurality of semiconductor light emitting elements, each of the plurality of semiconductor light emitting elements being circumferentially spaced apart from one another on a plurality of concentric circles.

5. The lighting device of claim 1, further comprising a plurality of semiconductor light emitting elements, each of the plurality of semiconductor light emitting elements to emit a same color light or to emit a different color light so as to provide for specific color lighting.

6. The lighting device of claim 1, wherein the reflective member is a diffusive reflector.

7. The lighting device of claim 1, wherein the substantially transparent output window has a haze effect to diffuse the extracted light.

8. The lighting device of claim 1, wherein the combination of the thermal heat sink member and the output window form a light bulb shape.

9. The lighting device of claim 1, wherein the electrical power connector comprises a standard Edison-type screw connector.

10. The lighting device of claim 9, wherein the solid state lighting device has a standard A19 incandescent bulb shape.

11. A side illumination solid-state white lighting device, comprising:

a light reflective cavity enclosed by an electrical power connector, a substantially transparent output window and a thermally conductive substrate, the output window having a first end mounted about a peripheral edge of a top surface of the electrical power connector and a second end mounted about a peripheral edge of a bottom surface of the thermally conductive substrate, wherein the electrical power connector and the thermally conductive substrate are disposed in substantially parallel relation to one another;

a support post positioned along a center axis of the light reflective cavity;

at least one semiconductor light emitting element mounted on the bottom surface of the thermally conductive substrate and positioned within the reflective cavity such that a forward light emitting path of the at least one semiconductor light emitting element is directed towards the electrical power connector;

a first wavelength conversion element positioned within the reflective cavity, the first wavelength conversion element to absorb a primary light emitted from the at least one semiconductor light emitting element and to convert at least a portion of the primary light to a secondary light having a second wavelength;

a reflective member positioned within the reflective cavity such that at least a portion of the primary light and at least a portion of the secondary light will be reflected by the reflective member and extracted through the output window;

an electrical conversion member positioned above the thermally conductive substrate and external to the light reflective cavity;

a thermal heat sink member positioned to enclose the electrical conversion member and in contact with a peripheral edge of the thermally conductive substrate; and a power line positioned within the support post to electrically connect the electrical conversion member to the electrical power connector.

12. The lighting device of claim 11, wherein the first wavelength conversion element is deposited on the at least one semiconductor light emitting element.

13. The lighting device of claim 11, wherein the first wavelength conversion element is deposited on the reflective member.

14. The lighting device of claim 11, wherein the at least one semiconductor light emitting element emits a blue primary light and the first wavelength conversion element is a yellow phosphor or a green/orange phosphor mixture.

15. The lighting device of claim 11, wherein the at least one semiconductor light emitting element emits a near-UV primary light and the first wavelength conversion element is a blue, red and green quantum dots mixture.

16. The lighting device of claim 11, wherein the at least one semiconductor light emitting element emits a near-infrared primary light and the first wavelength conversion element is an up-conversion phosphor.

17. The lighting device of claim 14, further comprising a second wavelength conversion element deposited on the reflective member, the second wavelength conversion element being a reddish orange phosphor such that the combination of the primary blue light, the yellow light excited by the first wavelength conversion element and the reddish orange light excited by the second wavelength conversion element result in a warm white light.

18. The lighting device of claim 17, further comprising a semiconductor light emitting element to emit a green light to compensate for the shortage of bluish green spectrum in the excited yellow light.

19. The lighting device of claim 11, wherein the solid state white lighting device has a standard A19 incandescent bulb shape.

20. A side illumination solid-state white lighting device, comprising:

a light reflective cavity enclosed by an electrical power connector, a substantially transparent output window and a first reflective element, the output window having a first end mounted about a peripheral edge of a top surface of the electrical power connector and a second end mounted about a peripheral edge of a bottom surface of the first reflective element, wherein the electrical power connector and the first reflective element are disposed in substantially parallel relation to one another;

a support post positioned along a center axis of the light reflective cavity;

an electrical conversion member positioned above the first light reflective element and external to the light reflective cavity;

a thermal heat sink member positioned to enclose the electrical conversion member and the first light reflective element;

a thermally conductive substrate positioned on an interior wall of the reflective cavity, below the first reflective member, the thermally conductive substrate thermally connected to the thermal heat sink;

at least one semiconductor light emitting element mounted on the thermally conductive substrate and positioned within the reflective cavity such that a forward light emitting path of the at least one semiconductor light emitting element is directed towards a center axis of the reflective cavity;

a first wavelength conversion element positioned within the reflective cavity, the first wavelength conversion element to absorb a primary light emitted from the at least one semiconductor light emitting element and to convert at least a portion of the primary light to a secondary light having a second wavelength;

a second reflective member positioned within the reflective cavity such that at least a portion of the light emitted from the at least one semiconductor light emitting element will be reflected by the first reflective member and the second reflective member, and extracted through the output window; and a power line positioned within the support post to electrically connect the electrical conversion member to the electrical power connector.

21. The lighting device of claim 20, wherein the at least one semiconductor light emitting element emits a blue primary light and the first wavelength conversion element is a yellow phosphor or a green/orange phosphor mixture.

22. The lighting device of claim 21, further comprising a second wavelength conversion element deposited on the first reflective member or the second reflective member, the second wavelength conversion element being a reddish orange phosphor such that the combination of the primary blue light, the yellow light excited by the first wavelength conversion element and the reddish orange light excited by the second wavelength conversion element result in a warm white light.

* * * * *